UNITED STATES PATENT OFFICE.

OTTO P. AMEND, OF NEW YORK, N. Y.

COMPOUND FOR PYROXYLINE OR NITRO-CELLULOSE.

SPECIFICATION forming part of Letters Patent No. 372,100, dated October 25, 1887.

Application filed May 4, 1887. Serial No. 237,064. (No specimens.)

*To all whom it may concern:*

Be it known that I, OTTO P. AMEND, a citizen of the United States, residing at New York, in the county and State of New York, have invented a new and useful Improvement in Compounds for Pyroxyline or Nitro-Cellulose, of which the following is a specification.

In the treatment of pyroxyline by the process of manufacture commonly in use at the present time it is customary to effect its solution by the use of alcohol in conjunction with camphor; but this process is expensive, both on account of the large cost of the alcohol and because of the great waste consequent on its rapid evaporation. Another objection to the use of alcohol is the liability to fire and explosions resulting from the large quantities of alcoholic vapors always present during the process of manufacture.

The object of my invention is to produce a solvent which may be substituted in the place of alcohol in this process of dissolving pyroxyline, and I have found that the compound resulting from the action of free chlorine upon amylic alcohol or fusel-oil is a perfect substitute for alcohol, and also that it overcomes the objections above set forth.

My new solvent is produced by subjecting amylic alcohol to the action of free chlorine and then removing the excess of chlorine by washing and filtering.

This compound consists of a mixture of ethers, the larger portion of it being chloride of amyl. The other constituents are amylchloral, monochlorvaleraldehyde, and dichlorvaleraldehyde, together with small quantities of some minor products, which may be disregarded. All of these constituents, severally, have solvent properties, and the action of the liquid is not therefore the result of the mixture or combination or of any particular proportions of these constituents. It is evident, therefore, that it is not necessary to remove any of the constituents resulting from the chlorination process, but that the liquid produced may at once be used as a substitute for the alcohol. The chloride of amyl is, however, the main product of the process, and the most important one; but I do not limit myself to its use alone, as I have pointed out that the presence of other subordinate chlorine compounds does not affect its solvent properties.

What I claim, and desire to secure by Letters Patent, is—

As a new solvent for pyroxyline or nitro-cellulose, chloride of amyl in conjunction with camphor, substantially as set forth.

OTTO P. AMEND.

Witnesses:
WILLIAM S. BREAKEY,
FREDK. C. VIELE.